United States Patent
Wei et al.

(10) Patent No.: US 11,392,146 B2
(45) Date of Patent: *Jul. 19, 2022

(54) METHOD FOR DETECTING TARGET OBJECT, DETECTION APPARATUS AND ROBOT

(71) Applicant: SZ DJI TECHNOLOGY CO., LTD., Shenzhen (CN)

(72) Inventors: Jidong Wei, Shenzhen (CN); Ren Lin, Shenzhen (CN); Shengyang Chen, Shenzhen (CN); Huasen Zhang, Shenzhen (CN); Jun Ren, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,011

(22) Filed: Jan. 27, 2020

(65) Prior Publication Data

US 2020/0159256 A1 May 21, 2020

Related U.S. Application Data

(63) Continuation of application No. 15/593,559, filed on May 12, 2017, now Pat. No. 10,551,854, which is a
(Continued)

(51) Int. Cl.
*G05D 1/12* (2006.01)
*H04N 7/18* (2006.01)
(Continued)

(52) U.S. Cl.
CPC .............. *G05D 1/12* (2013.01); *B25J 9/1694* (2013.01); *G05B 19/406* (2013.01);
(Continued)

(58) Field of Classification Search
CPC ...... G05D 1/12; G05D 1/0094; G05B 19/406; G05B 2219/24097; G06T 7/70; G06T 7/11; H04N 7/183
See application file for complete search history.

(56) References Cited

U.S. PATENT DOCUMENTS 5,509,847 A 4/1996 Jinno et al.
8,599,252 B2 * 12/2013 Komoto .................. G06T 7/215
382/173
(Continued)

FOREIGN PATENT DOCUMENTS

CN 1994689 A 7/2007
CN 101195221 A 6/2008
(Continued)

OTHER PUBLICATIONS

The World Intellectual Property Organization (WIPO) International Search Report and Written Opinion for PCT/CN2014/090907 dated Jul. 29, 2015 9 Pages.
(Continued)

*Primary Examiner* — Bobbak Safaipour
(74) *Attorney, Agent, or Firm* — Anova Law Group, PLLC

(57) ABSTRACT

A method for tracking a target object using a detection apparatus includes calculating movement state information of the target object with respect to the detection apparatus according to one or more monitored images, calculating a distance between the target object and the detection apparatus, in response to the distance being not greater than a pre-set distance threshold, estimating, based on first state information including the movement state information, second state information of the target object after a pre-set delay
(Continued)

identifying, by a detection apparatus, a target object in a monitored region, and calculating first state information of the target object with respect to this detection apparatus — S101 estimating second state information of the target object after a pre-set delay duration value according to the first state information — S102 performing a processing operation on the target object according to the estimated second state information — S103 duration, and performing an operation with respect to the target object according to the estimated second state information.

20 Claims, 8 Drawing Sheets

Related U.S. Application Data continuation of application No. PCT/CN2014/090907, filed on Nov. 12, 2014.

(51) Int. Cl.
    *G06T 7/70*       (2017.01)
    *G06T 7/11*       (2017.01)
    *G05B 19/406*    (2006.01)
    *G05D 1/00*      (2006.01)
    *B25J 9/16*       (2006.01)
    *G06T 7/277*     (2017.01)
    *G06V 10/56*     (2022.01)
    *G06V 10/44*     (2022.01)
    *G06V 20/52*     (2022.01)

(52) U.S. Cl.
    CPC .............. *G05D 1/0094* (2013.01); *G06T 7/11* (2017.01); *G06T 7/277* (2017.01); *G06T 7/70* (2017.01); *G06V 10/454* (2022.01); *G06V 10/56* (2022.01); *G06V 20/52* (2022.01); *H04N 7/183* (2013.01); *H04N 7/188* (2013.01); *G05B 2219/24097* (2013.01); *G05B 2219/40577* (2013.01); *G06T 2207/10024* (2013.01); *G06V 2201/07* (2022.01)

(56) References Cited

U.S. PATENT DOCUMENTS

| | | | |
|---|---|---|---|
| 9,164,506 B1* | 10/2015 | Zang | G05D 1/0094 |
| 9,922,427 B2* | 3/2018 | Dielacher | G01S 17/86 |
| 10,187,617 B2* | 1/2019 | Bhowmick | G06T 7/277 |
| 10,551,854 B2* | 2/2020 | Wei | B25J 9/1694 |
| 2003/0183720 A1* | 10/2003 | La Fata | F41G 7/007 |
| | | | 342/63 |
| 2008/0048907 A1* | 2/2008 | Matsuura | G01S 3/808 |
| | | | 342/147 |
| 2011/0122154 A1* | 5/2011 | Kawai | G11B 27/034 |
| | | | 345/629 |
| 2012/0105630 A1* | 5/2012 | Cao | G06T 7/246 |
| | | | 348/143 |
| 2012/0287274 A1* | 11/2012 | Bevirt | H04N 7/185 |
| | | | 348/E7.085 |
| 2012/0316685 A1* | 12/2012 | Pettersson | F16M 11/18 |
| | | | 248/560 |
| 2015/0197246 A1* | 7/2015 | Nagasaka | B60W 30/10 |
| | | | 701/1 |
| 2015/0242687 A1* | 8/2015 | Seo | G06V 20/00 |
| | | | 382/103 |
| 2016/0014309 A1* | 1/2016 | Ellison | F16M 13/02 |
| | | | 248/550 |
| 2017/0102715 A1* | 4/2017 | Shi | B64D 47/08 |
| 2017/0175948 A1* | 6/2017 | Zeise | G02B 27/644 |
| 2017/0307333 A1* | 10/2017 | Northrup | F41G 3/26 |
| 2019/0370977 A1* | 12/2019 | Makino | G06T 7/215 |
| 2020/0142042 A1* | 5/2020 | Hibino | G01S 17/42 |
| 2020/0258253 A1* | 8/2020 | Maeda | G01V 8/10 |

FOREIGN PATENT DOCUMENTS

| | | |
|---|---|---|
| CN | 102566432 A | 7/2012 |
| CN | 103203755 A | 7/2013 |
| CN | 103599631 A | 2/2014 |
| EP | 0875341 A1 | 11/1998 |
| JP | 62197777 A | 9/1987 |
| JP | 2000101902 A | 4/2000 |
| JP | 5090474 B2 | 12/2012 |

OTHER PUBLICATIONS

Yang, Qiyu, Application of Image Processing Technology in Robot Soccer Research, Jun. 15, 2005, pp. 28-42, 48, China.

Zhen, Luo, Key Technologies of Multi-Robot Coordination and Cooperation in Adversarial Environment, Jun. 15, 2008, p. 49, China.

Jie Zhu, Prediction of the real-time interceptor algorithm for robot football match simulation, Electronic Test, Feb. 2012, pp. 31-34, No. 2, China.

* cited by examiner

METHOD FOR DETECTING TARGET OBJECT, DETECTION APPARATUS AND ROBOT

CROSS-REFERENCE TO RELATED APPLICATIONS

This is a continuation application of application Ser. No. 15/593,559, filed on May 12, 2017, which is a continuation application of International Application No. PCT/CN2014/090907, filed on Nov. 12, 2014, the entire contents of both of which are incorporated herein by reference.

TECHNICAL FIELD

The present disclosure relates to the technical field of computer control, and in particular to a method for detecting a target object, a detection apparatus, and a robot.

BACKGROUND

At present, the existing monitoring, identifying, and tracking of a target are generally achieved by the tracking of a video image. A target tracking technology based on a video image incorporates technologies in the fields of vision, pattern recognition, and artificial intelligence, and so on. Moreover, this technology is mainly applied to the tracking and identifying of a vehicle, security monitoring, and an artificial intelligence robot.

In the existing art, the tracking based on a video image can basically and accurately determine a certain target object from an image. However, in some instances, merely determining a target object from a video image cannot satisfy intelligence requirements, for example, in the field of artificial intelligence robots, especially in the field of intelligent robot contests, and it is necessary to further improve the existing target tracking technology.

SUMMARY

The embodiments of the present disclosure provide a method for detecting a target object, a detection apparatus, and a robot, which can satisfy automation and intelligence requirements of a user for object tracking and movement state estimation.

Embodiments of the disclosure provides a method for detecting a target object by a detection apparatus comprising identifying a target object in a monitored region, calculating first state information of the target object with respect to the detection apparatus, estimating, based on the first state information, second state information of the target object after a pre-set delay duration, and performing an operation with respect to the target object according to the estimated second state information.

In some embodiments, the first state information comprises first position information, velocity information, and movement direction information of the target object with respect to the detection apparatus. Estimating the second state information comprises calculating, according to the velocity information, a displacement of the target object after the pre-set delay duration and estimating second position information of the target object as the second state information after movement according to the first position information, the movement direction information, and the calculated displacement.

In some embodiments, identifying the target object in the monitored region comprises acquiring an image of the monitored region, determining whether the image contains a target having a specified color feature, and, if so, determining the identified target as the target object.

In some embodiments, determining whether the image contains the target having the specified color feature comprises performing color detection on the acquired image based on a pre-set color interval to determine initial target regions having the specified color feature in the image, quantifying the acquired image into a binary image, performing a connected component detection on components corresponding to the initial target region in the binary image to determine contour outlines of the initial target region, performing a merging operation on determined contour outlines based on a pre-set merging rule to obtain combined components, and filtering the combined components according to pre-set filtering shape or filtering size information to obtain a filtered component as the target.

In some embodiments, performing the connected component detection comprises filtering a noise point from the binary image and performing the connected component detection on the components corresponding to the initial target region in the binary image after the noise point is filtered.

In some embodiments, performing the merging operation comprises calculating a distance between two adjacent ones of the contour outlines according to edge position coordinates of the contour outlines, determining a color similarity between the two adjacent ones of the contour outlines, and merging the two adjacent ones of the contour outlines if the distance and the color similarity satisfy a pre-set merging distance and a pre-set similarity requirement, respectively.

In some embodiments, performing the merging operation comprises detecting whether a component between two adjacent connected components meets a pre-set sheltering target feature, and, if so, determining that the two adjacent connected components satisfy the pre-set merging rule and merging two adjacent contour outlines corresponding to the two adjacent connected components.

In some embodiments, calculating the first state information of the target object with respect to the detection apparatus comprises calculating movement state information of the target object with respect to the detection apparatus according to a monitored image and calculating a distance between the target object and the detection apparatus. If the distance is greater than a pre-set distance threshold, the movement state information of the target object with respect to the detection apparatus again according to a new image and whether the distance between the target object and the detection apparatus is less than the pre-set distance threshold is judged. The calculating and the judging are repeated until movement state information corresponding to a distance not greater than the pre-set distance threshold value is determined. If the distance is not greater than the pre-set distance threshold, the movement state information is determined as the first state information.

In some embodiments, calculating the movement state information of the target object with respect to the detection apparatus comprises determining first pixel coordinates of the target object from a first image acquired at a current moment, performing a coordinate mapping transformation on the first pixel coordinates to obtain initial position information of the target object in a coordinate system centred on the detection apparatus, determining second pixel coordinates of the target object from a second image acquired at a moment after a pre-set time interval, performing a coordinate mapping transformation on the second pixel coordinates to obtain movement position information of the target object in the coordinate system centred on the detection apparatus, determining velocity information and moving direction information of the target object according to the initial position information, the movement position information, and the pre-set time interval, and determining the velocity information, the direction information, and the movement position information as the movement state information of the target object.

In some embodiments, the method further comprises performing a position estimation on monitored objects based on movement state information of the objects to obtain position estimation values of the monitored objects and determining the monitored objects based on the position estimation values and actual positions of the monitored objects in the image.

In some embodiments, performing the operation with respect to the target object comprises adjusting a rotation parameter of a gimbal according to the second position information in the estimated second state information and a direction with respect to the detection apparatus to aim a payload on the gimbal at the target object.

Accordingly, the embodiments of the present disclosure further provide a detection apparatus, comprising:

an identification module configured to identify a target object in a monitored region, and calculate first state information of the target object with respect to this detection apparatus;

a processing module configured to estimate second state information of the target object after a pre-set delay duration value according to the first state information; and a control module configured to perform a processing operation on the target object according to the estimated second state information.

In some embodiments, the first state information comprises: first position information, velocity information, and movement direction information of the target object with respect to this detection apparatus; and the processing module, specifically configured to calculate the displacement of the target object after the pre-set delay duration value according to the velocity information; estimate second position information of the target object after movement according to the first position information, the movement direction information, and the calculated displacement; and determine the second position information as second state information.

In some embodiments, the identification module comprises:

an acquisition unit configured to acquire an image of the monitored region;

an identification unit configured to analyze and identify whether the image contains a target having a specified color feature; and a determination unit configured to determine the identified target as a target object if an identification result of the identification unit is that the image contains a target having a specified color feature.

In some embodiments, the identification unit is specifically configured to perform color detection on the acquired image based on pre-setting a pre-set color interval to determine an initial target region having the specified color feature in the image; quantify the acquired image as a binary image; perform connected component detection on a region corresponding to the initial target region in the binary image to determine a contour outline of the initial target region; perform a merging operation on various determined contour outlines based on a pre-set merging rule; and filter various regions obtained after merging according to pre-set filtering shape or filtering size information and take a filtered region as a target.

In some embodiments, the identification unit is specifically configured to filter a noise point in a binary image while being configured to perform connected component detection on a region corresponding to the initial target region in the binary image; and perform connected component detection on a region corresponding to the initial target region in the binary image with the noise point filtered off.

In some embodiments, the identification unit is specifically configured to calculate a distance between two adjacent contour outlines according to edge position coordinates of the various determined contour outlines while being configured to perform a merging operation on various determined contour outlines based on the pre-set merging rule; determine a color similarity between the two adjacent contour outlines; and merge two adjacent contour outlines with a distance value and similarity satisfying a pre-set merging distance and similarity requirement.

In some embodiments, the identification unit is specifically configured to detect whether a component between two adjacent connected components meets a pre-set sheltering target feature while being configured to perform a merging operation on various determined contour outlines based on the pre-set merging rule, if it does, determining that the two adjacent connected components satisfy the pre-set merging rule, and merging the two adjacent contour outlines.

In some embodiments, the identification module further comprises:

a state calculation module, configured to calculate movement state information of the target object with respect to this detection apparatus according to a monitored image;

a distance calculation unit, configured to calculate a distance value between the target object and this detection apparatus;

a state processing unit configured to calculate the movement state information of the target object with respect to this detection apparatus again according to a monitored new image if the distance value is greater than a pre-set distance threshold value, and judge whether the distance value between the target object and this detection apparatus is less than the pre-set distance threshold value again, and repeatedly performing this step until movement state information is determined when the distance value is not greater than the pre-set distance threshold value; and a state determination unit configured to determine the movement state information as the first state information if the distance value is not greater than the pre-set distance threshold value.

In some embodiments, while being configured to calculate the movement state information of the target object with respect to this detection apparatus, the state calculation unit or the state processing unit is specifically configured to determine pixel coordinates of the target object from an image acquired at a current moment, and perform coordinate mapping transformation to obtain initial position information of the target object in a coordinate system centred on the detection apparatus; determine pixel coordinates of the target object from an image acquired at a moment after a pre-set time interval, and perform coordinate mapping transformation to obtain movement position information of the target object in a coordinate system centred on the detection apparatus; determine the movement position information and the pre-set time interval, the velocity information and the direction information of the target object according to the initial position information; and take the determined velocity information and direction information and the movement position information as the movement state information of the target object.

In some embodiments, the apparatus further comprises:

a distinguishing module, configured to perform position estimation on various objects to be monitored based on movement state information of each of the objects, and associate a position estimation value obtained and actual positions of the various objects to be monitored in the image to distinguish each of the objects.

In some embodiments, the control module is configured to adjust a rotation parameter of a gimbal according to the second position information in the estimated second state information and a direction with respect to the detection apparatus so that a payload on the gimbal is aimed at the target object.

Embodiments of the present disclosure further provide a robot comprising an image collection apparatus configured to capture an image of a monitored region and a processor configured to calculate first state information of the target object with respect to the detection apparatus, estimate, based on the first state information, second state information of the target object after a pre-set delay duration, and perform an operation with respect to the target object according to the estimated second state information.

In some embodiments, the first state information comprises first position information, velocity information, and movement direction information of the target object with respect to the detection apparatus. The processor is further configured to calculate, according to the velocity information, a displacement of the target object after the pre-set delay duration, and estimate second position information of the target object as the second state information after movement according to the first position information, the movement direction information, and the calculated displacement.

In some embodiments, the processor is further configured to acquire an image of the monitored region, determine whether the image contains a target having a specified color feature, and, if so, determine the identified target as the target object.

In some embodiments, the processor is further configured to perform color detection on the acquired image based on a pre-set color interval to determine initial target regions having the specified color feature in the image, quantify the acquired image into a binary image, perform a connected component detection on components corresponding to the initial target region in the binary image to determine contour outlines of the initial target region, perform a merging operation on determined contour outlines based on a pre-set merging rule to obtain combined components, and filter the combined components according to pre-set filtering shape or filtering size information to obtain a filtered component as the target.

In some embodiments, the processor is further configured to filter a noise point from the binary image and perform the connected component detection on the components corresponding to the initial target region in the binary image after the noise point is filtered.

In some embodiments, the processor is further configured to calculate a distance between two adjacent ones of the contour outlines according to edge position coordinates of the contour outlines, determine a color similarity between the two adjacent ones of the contour outlines, and merge the two adjacent ones of the contour outlines if the distance and the color similarity satisfy a pre-set merging distance and a pre-set similarity requirement, respectively.

In some embodiments, the processor is further configured to detect whether a component between two adjacent connected components meets a pre-set sheltering target feature, and, if so, determine that the two adjacent connected components satisfy the pre-set merging rule and merge two adjacent contour outlines corresponding to the two adjacent connected components.

In some embodiments, the processor is further configured to calculate movement state information of the target object with respect to the detection apparatus according to a monitored image and calculate a distance between the target object and the detection apparatus. If the distance is greater than a pre-set distance threshold, the movement state information of the target object with respect to the detection apparatus again according to a new image is calculated and whether the distance between the target object and the detection apparatus is less than the pre-set distance threshold is judged. The calculating and the judging are repeated until movement state information corresponding to a distance not greater than the pre-set distance threshold value is determined. If the distance is not greater than the pre-set distance threshold, the movement state information is determined as the first state information.

In some embodiments, the processor is further configured to determine first pixel coordinates of the target object from a first image acquired at a current moment, perform a coordinate mapping transformation on the first pixel coordinates to obtain initial position information of the target object in a coordinate system centred on the detection apparatus, determine second pixel coordinates of the target object from a second image acquired at a moment after a pre-set time interval, perform a coordinate mapping transformation on the second pixel coordinates to obtain movement position information of the target object in the coordinate system centred on the detection apparatus, determine velocity information and moving direction information of the target object according to the initial position information, the movement position information, and the pre-set time interval, and determine the velocity information, the direction information, and the movement position information as the movement state information of the target object.

The embodiments of the present disclosure can realize identification of a target object and estimation of states such as a movement position, etc., and can quickly and accurately complete the tracking and state estimation of a target object. This adds new functions and satisfies automation and intelligence requirements of a user for object tracking and movement state estimation.

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

The technical solutions in the embodiments of the present disclosure are hereinafter described clearly with reference to the accompanying drawings. Evidently, the described embodiments are only some rather than all of the embodiments of the present disclosure. All other embodiments obtained by a person of ordinary skill in the art based on the embodiments of the present disclosure without creative efforts shall fall within the scope of the present disclosure.

The embodiments of the present disclosure are capable of estimating a movement state of a target object at a next moment (the moment after a certain time interval) according to a current movement state of the target object, and realizing tracking and prediction functions of the target object. Specifically, pixel coordinates in an image can be converted into actual position coordinates, to calculate a movement velocity and direction based on a time interval and displacement of the actual position coordinates at the time interval, so as to determine a movement state comprising a position, the movement velocity, and direction.

Figure 1:
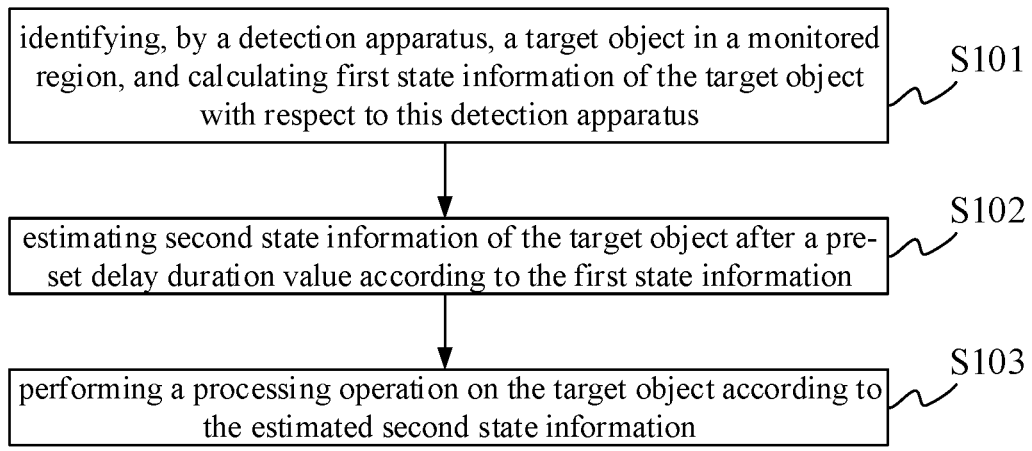
FIG. 1 is a flowchart of a method for detecting a target object according to an embodiment of the present disclosure.

Specifically, with reference to FIG. 1, which is a flowchart of a method for detecting a target object according to an embodiment of the present disclosure, the method according to the embodiment of the present disclosure can be applied to an object tracking apparatus being realized by a detection apparatus, such as an apparatus like a contest robot. Specifically, the method comprises:

S101: identifying, by a detection apparatus, a target object in a monitored region, and calculating first state information of the target object with respect to this detection apparatus.

A module, such as a camera, can be invoked to photograph an image of a monitored region, and identify whether the region comprises a target object at the current moment based on a pre-set color and/or contour outline and size about the target object. If it does, then first state information is calculated; and if no, then the angle of the camera is changed or the detection apparatus is moved continuously to photograph the image to search for the target object. The camera is a camera after calibration.

After the target object is monitored, first state information of the target object with respect to this detection apparatus can be calculated. The first state information can specifically comprise: information such as a position, a movement velocity, or a direction of the target object with respect to this detection apparatus. Specifically, the first state information can also be calculated based on the photographed image which comprises the target object.

During specific implementation, a position of the target object with respect to the detection apparatus can be calculated as: determining pixel position coordinates of a region where the target object is located in the image; and mapping pixel coordinates into a coordinate system centred on the detection apparatus to obtain position coordinates of the target object in the coordinate system centred on the detection apparatus. The position coordinates are position information of the target object with respect to this detection apparatus. It should be noted that the pixel position coordinates and the position coordinates with respect to the detection apparatus can merely be position coordinates of a geometrical central point of the target object, and the coordinate system centred on the detection apparatus can refer to that a central point of a camera of the detection apparatus is taken as an origin of the coordinate system.

After obtaining a relative position, a new relative position of the target object at a next moment (such as the moment after one second) can be calculated. Displacement and a relative movement direction of the target object can be obtained based on the new relative position and the relative position at a previous moment. A movement velocity at this time can be calculated according to the displacement and the time interval.

S102: estimating second state information of the target object after a pre-set delay duration value according to the first state information.

Specifically, the estimated second state information mainly comprises a position and a direction of the target object with respect to this detection apparatus. The pre-set delay duration can be a pre-set time interval. For example, in a robot contest, the pre-set delay duration is comprehensively judged according to an estimation duration in step S102, an adjustment duration of an apparatus, such as a gimbal, for adjusting a direction, and a filling and/or launching duration of a contest cannonball, wherein the estimation duration, adjustment duration, and filling and/or launching duration are duration values that are learned via a large number of actual duration calculation trainings.

S103: performing a processing operation on the target object according to the estimated second state information.

After the second state information is obtained, a processing operation can be performed on the target object according to practical application requirements. For example, in the contest robot, a directional angle of an apparatus, such as the gimbal, can be adjusted according to relative direction information in the second state information, so as to for the robot to point to and aim at a position in the second state information, and launch a contest cannonball to hit the target object.

The embodiments of the present disclosure can realize identification of a target object and estimation of states such as a movement position, etc., and can quickly and accurately complete the tracking and state estimation of a target object. The embodiments of the present disclosure add new functions and satisfy automation and intelligence requirements of a user for object tracking and movement state estimation.

Figure 2:
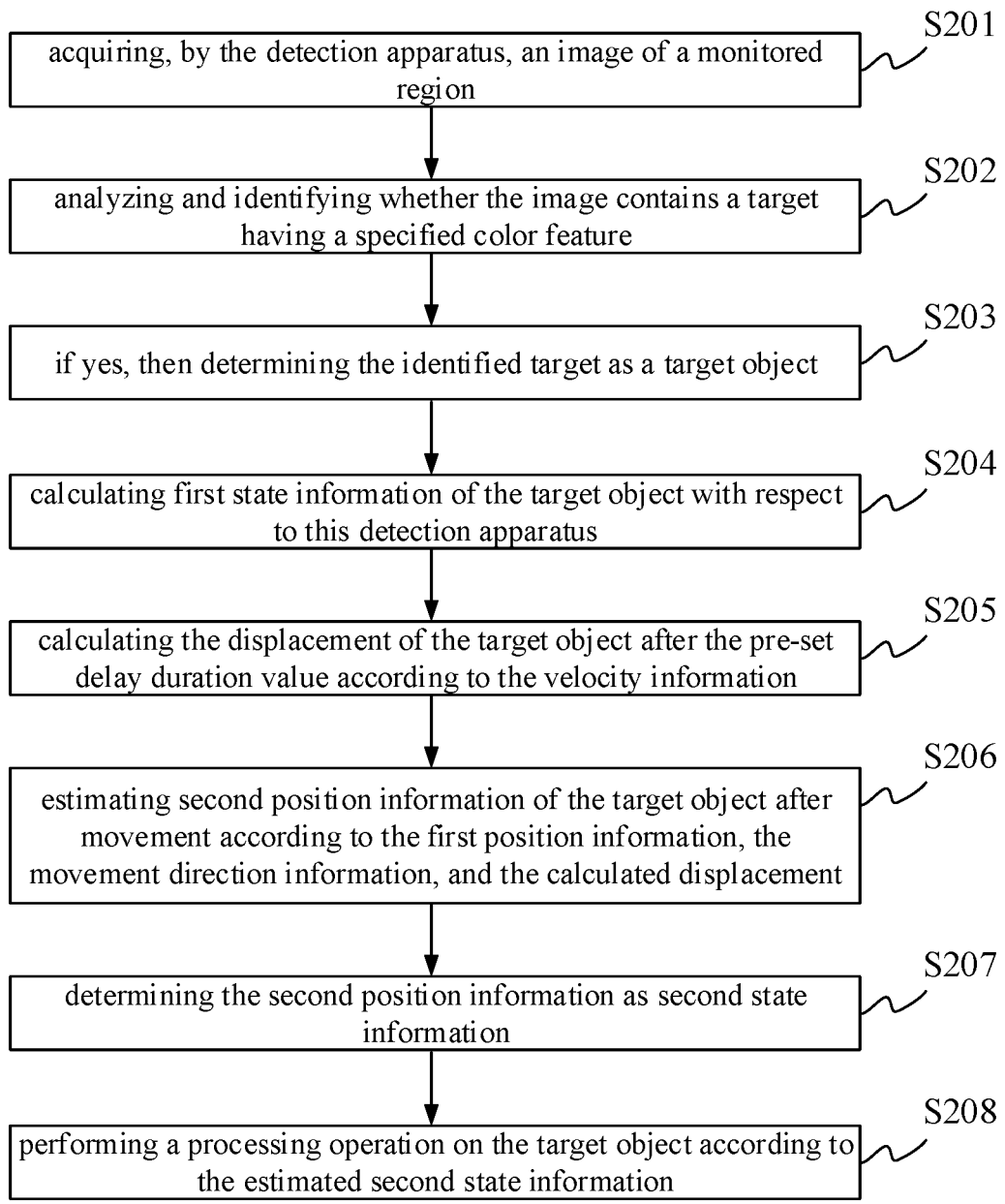
FIG. 2 is a flowchart of another method for detecting a target object according to an embodiment of the present disclosure.

Again, with reference to FIG. 2, which is a flowchart of another method for detecting a target object according to an embodiment of the present disclosure, the method according to the embodiment of the present disclosure can be applied to an object tracking apparatus being realized by a detection apparatus, such as an apparatus like a contest robot. Specifically, the method comprises:

S201: acquiring, by the detection apparatus, an image of a monitored region.

Specifically, an image in a current environment is photographed and acquired by invoking a camera provided in this detection apparatus.

S202: analyzing and identifying whether the image contains a target having a specified color feature.

By analyzing and identifying the image based on a color identification strategy, a target in the image can be identified simply and rapidly. A large amount of picture data of the target object can be collected in advance, by training, to obtain a color interval that may exist for the target object. Consequently, this color interval is used as a threshold value to perform color detection on the image acquired in step S201 to find a region that seems to be the target object, i.e., to find a target region having a specified color feature.

Figure 3:
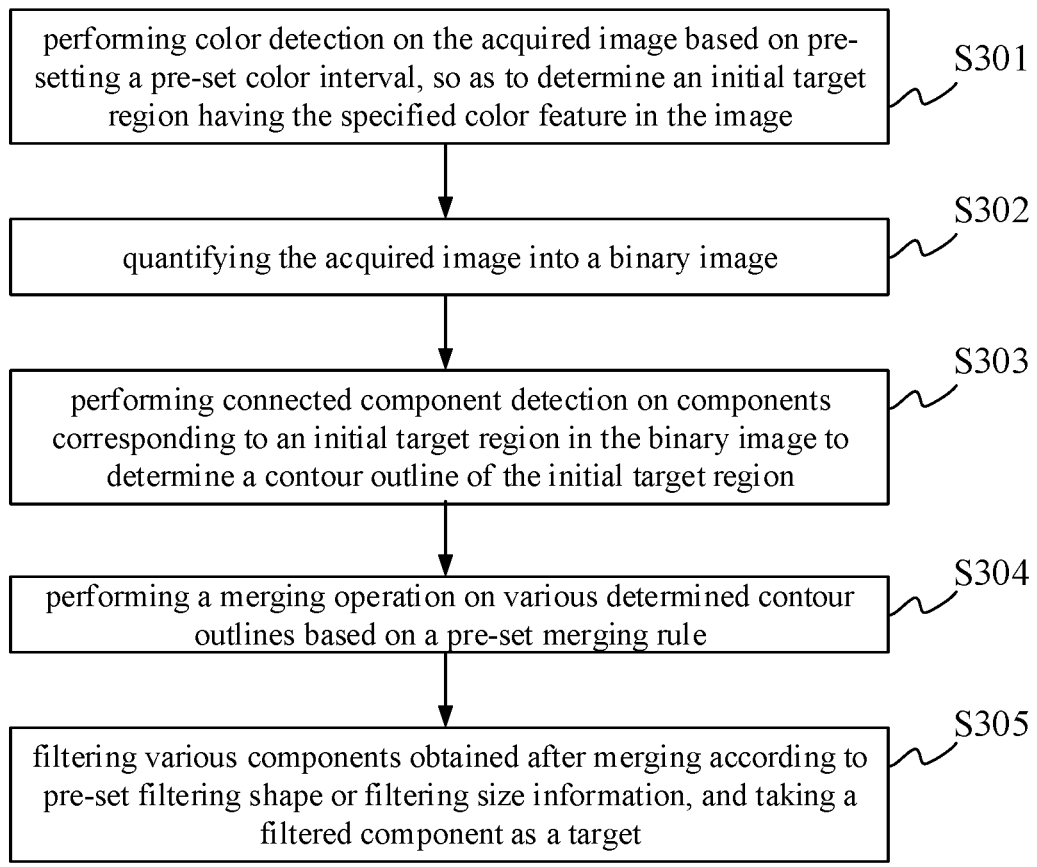
FIG. 3 is a flowchart of a method for identifying a target having a specified color feature according to an embodiment of the present disclosure.

In step S202, the image acquired in step S201 can be analyzed and identified with reference to the description in the embodiment corresponding to FIG. 3. If the region which seems to be the target object is found, then the following step S203 is performed; otherwise, steps S201 and S202 are re-performed until a region that seems to be the target object in a corresponding image is found.

S203: if yes, then determining the identified target as a target object.

S204: calculating first state information of the target object with respect to this detection apparatus.

Specifically, the first state information comprises first position information, velocity information, and movement direction information of the target object with respect to this detection apparatus. The position information therein can be obtained via mapping transformation from image pixel coordinates to actual coordinates centred on the camera of the detection apparatus, and the velocity and movement direction can be calculated and obtained according to a position difference of a certain time interval.

The acquisition of an actual position of the target object in the image is specifically as follows. Firstly, performing calibration on the camera mentioned above refers to establishing a transformation relationship between an image coordinate system and an actual spatial coordinate system, so as to determine a position of a point in the image in an actual space with respect to the detection apparatus (camera). A specific calibration method is placing a unique calibration object in a certain determined scene, measuring a position thereof with respect to the camera, and calculating the transformation relationship between the two coordinate systems by collecting a large amount of image data. After the transformation relationship between the coordinate systems is determined, actual spatial coordinates of the target object can be determined via image coordinates.

Secondly, after calibration, a position of the point in the image coordinate system in the actual space can be calculated according to the calculated transformation relationship (rotation and translation, etc.). It should be noted that a certain point in the image coordinates cannot have its position accurately restored in the actual space using a monocular camera. In an embodiment of the present disclosure, when a monocular camera is used, height information thereof can be specifically ignored, and therefore a relatively accurate transformation relationship can be obtained.

Figure 4:
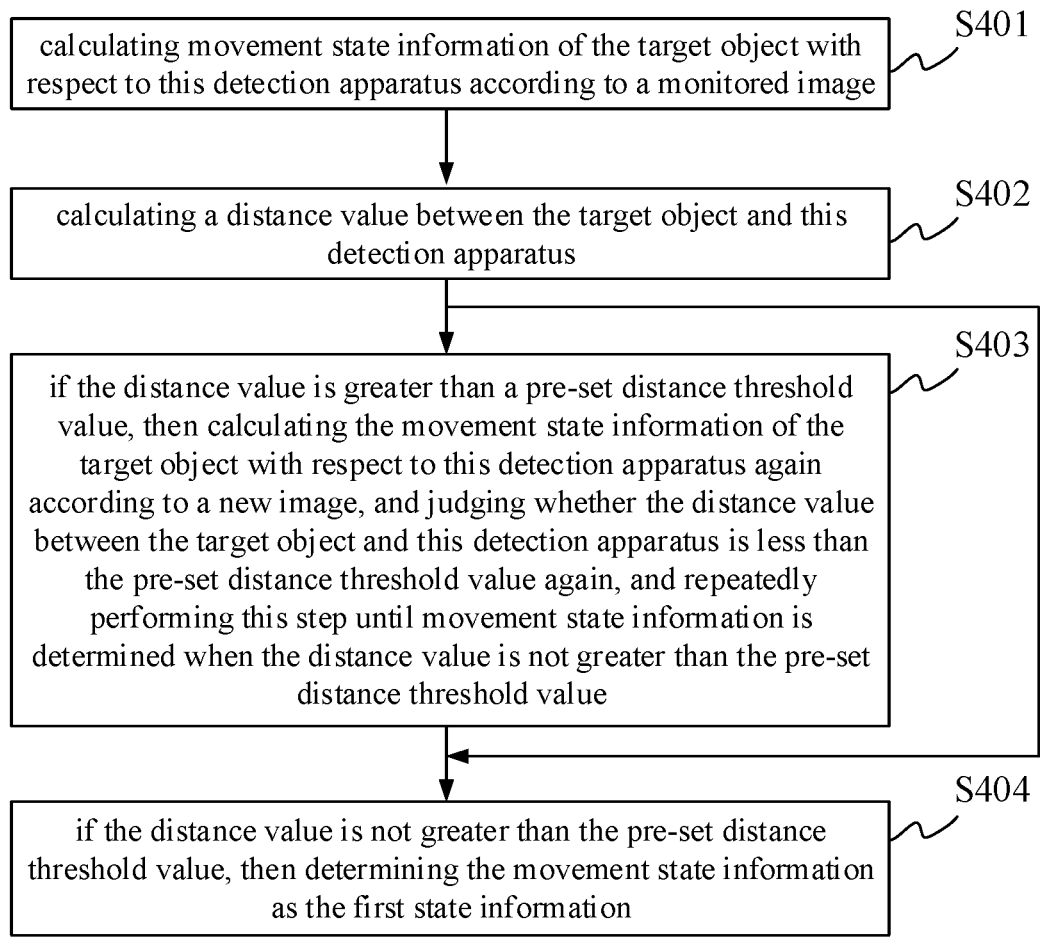
FIG. 4 is a flowchart of a method for calculating a movement state according to an embodiment of the present disclosure.

The first state information can be calculated with reference to the description regarding the acquisition of the movement state information in the embodiment corresponding to FIG. 4.

S205: calculating the displacement of the target object after the pre-set delay duration value according to the velocity information.

S206: estimating second position information of the target object after movement according to the first position information, the movement direction information, and the calculated displacement.

S207: determining the second position information as second state information.

Displacement can be obtained according to a product of a velocity and a duration, and an exact position of the target object in the coordinate system centred on the camera of this detection apparatus after the delay duration value can be comprehensively determined by combining the product with a movement direction.

Before performing step S205, a distance between the target object and this detection apparatus can also be judged first, and the distance value can also be calculated via the coordinate system centred on the camera of this detection apparatus. When it is closer (within a certain distance threshold value) to this detection apparatus, step S205 is performed; otherwise, steps S201-S204 are performed continuously.

S208: performing a processing operation on the target object according to the estimated second state information.

In an embodiment of the present disclosure, step S208 can specifically comprise: adjusting a rotation parameter of a gimbal according to the second position information in the estimated second state information and a direction with respect to the detection apparatus so that a payload on the gimbal is aimed at the target object.

Specifically, with reference to FIG. 3, which is a flowchart of a method for identifying a target having a specified color feature according to an embodiment of the present disclosure, the method corresponds to the above-mentioned step S202, and specifically comprises:

S301: performing color detection on the acquired image based on pre-setting a pre-set color interval, so as to determine an initial target region having the specified color feature in the image.

S302: quantifying the acquired image into a binary image.

A large amount of picture data of the target object can be collected, by training, to obtain a color interval of the target object, and this color interval is taken to perform color detection on the image acquired in step S301 to find a region that seems to be the target object in the image and to quantify the region as a binary image.

S303: performing connected component detection on components corresponding to an initial target region in the binary image to determine a contour outline of the initial target region.

Specifically, the performing connected component detection on components corresponding to the initial target region in the binary image comprises: filtering a noise point from the binary image; and performing connected component detection on components corresponding to the initial target region in the binary image with the noise point filtered off.

An open operation can be performed on the obtained binary image to filter a noise point in a color detection result. Specifically, this system detects the target object via a color identification method. Other objects that have the same or a similar color to that of the target object may exist in the environment, or a corresponding color component may be generated in the image because of light. When performing filtering via color information, a color component that is not a target may be retained, which therefore needs to be filtered. During a noise filtering process, by analyzing actual data, it is found that the size and shape, etc. of a noise component greatly differ from a target vehicle, and therefore a noise point can be filtered by means of size limitation and shape limitation (a length-width ratio, a perimeter-region ratio, etc.).

S304: performing a merging operation on various determined contour outlines based on a pre-set merging rule.

Step S304 can specifically comprise: calculating a distance between two adjacent contour outlines according to edge position coordinates of the various determined contour outlines; determining a color similarity between the two adjacent contour outlines; and merging the two adjacent contour outlines with a distance value and similarity satisfying a pre-set merging distance and similarity requirement.

Connected component detection is performed on a suspected component of the image to calculate a contour outline, which can be approximately represented by a rectangle, of each suspected region. According to a distance and color similarity between connected components, connected components with a close distance and high similarity are merged.

In some embodiments, step S304 can specifically comprise: detecting whether a component between two adjacent connected components meets a pre-set sheltering target feature; and if it does, determining that the two adjacent connected components satisfy the pre-set merging rule, and merging the two adjacent contour outlines.

S305: filtering various components obtained after merging according to pre-set filtering shape or filtering size information, and taking a filtered component as a target.

A contour outline obtained after the contour outline merging operation is performed may merely be objects in the environment, such as pillars, which need to be filtered. Specifically, images of a large number of target objects can be trained in advance to obtain a shape (such as a length-width-height ratio) and/or size information (a region) of the target object, and an undesired region is filtered on this basis.

After steps S301-S305 mentioned above, a graphic object with respect to a target object in the image can be basically determined, and thus the tracking of the target object and detection of a position, a velocity, and a movement direction are performed.

Again, with reference to FIG. 4, which is a flowchart of a method for calculating a movement state according to an embodiment of the present disclosure, the method of the embodiment of the present disclosure specifically comprises:

S401: calculating movement state information of the target object with respect to this detection apparatus according to a monitored image.

S402: calculating a distance value between the target object and this detection apparatus.

S403: if the distance value is greater than a pre-set distance threshold value, then calculating the movement state information of the target object with respect to this detection apparatus again according to a new image, and judging whether the distance value between the target object and this detection apparatus is less than the pre-set distance threshold value again, and repeatedly performing this step until movement state information is determined when the distance value is not greater than the pre-set distance threshold value. The acquisition of a new image after judging a distance each time can be performed after a certain time interval.

S404: if the distance value is not greater than the pre-set distance threshold value, then determining the movement state information as the first state information.

When the target object is relatively far from this detection apparatus, it may not be possible to perform a corresponding processing operation thereon. For example, aiming and hitting cannot be performed in a contest robot. Therefore, it is only when the distance is closer that corresponding movement state information is determined as the first state information for determination of second state information at a later time. Moreover, during a movement process of the target object (or this detection apparatus), the movement state information continuously monitored by step S403 needs to be updated all the time until the distance between the target object and this detection apparatus is not greater than a pre-set distance threshold value.

In order for this detection apparatus to approach the target object as soon as possible, a control signal is generated according to detected movement state information (a position, a direction, etc.) about the target object to control a power component at a local end, so that this detection apparatus moves towards the target object.

The above-mentioned step of calculating movement state information of the target object with respect to this detection apparatus can specifically comprise:

determining pixel coordinates of the target object from an image acquired at a current moment, and performing coordinate mapping transformation to obtain initial position information of the target object in a coordinate system centred on the detection apparatus;

determining pixel coordinates of the target object from an image acquired at a moment after a pre-set time interval, and performing coordinate mapping transformation to obtain movement position information of the target object in a coordinate system centred on the detection apparatus;

determining the velocity information and the direction information of the target object according to the initial position information, the movement position information, and the pre-set time interval; and taking the determined velocity information, direction information, and movement position information as the movement state information of the target object.

The detection apparatus performs position estimation on various objects to be monitored based on movement state information of each of the objects, and performing association of a position estimation value obtained and actual positions of the various objects to be monitored in the image to determine each of the objects. That is to say, the detection apparatus can estimate a movement state (a position, a velocity, or a direction) of the target object at the current moment according to a movement state (a position, a velocity, or a direction) of the target object at the previous moment, and then the estimation state of the target object at the current moment and a detection result are associated according to position and color information to update a movement state for the corresponding target object.

Figure 5:
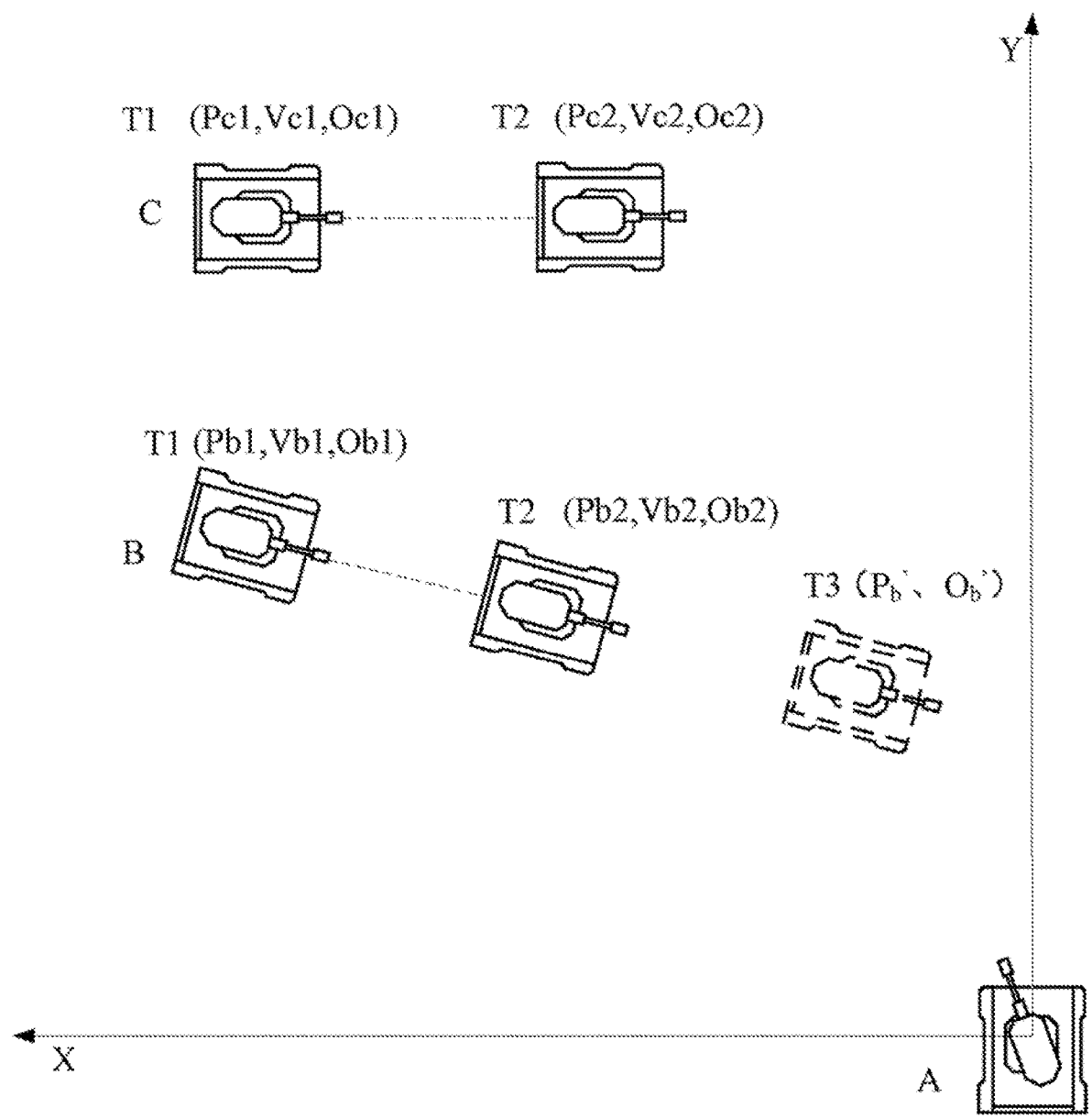
FIG. 5 is a schematic diagram of state estimation of a target object.

The schematic diagram of FIG. 5 is taken as an example for illustration. With regard to an object A mounted with this monitoring apparatus, a target object B and a target object C within a visual field can be monitored. At a T1 moment, the target object B and the target object C are far from this detection apparatus, which does not satisfy a launch condition. At this moment, according to information at a previous moment, a position P, a velocity V, and an orientation O of B and C can be calculated. At a T2 moment, measurement values of positions B and C at the current moment and a time difference between the two moments are determined via a detection means. According to the states of B and C at the T1 moment and the time difference, the P, V and O at the T2 moment can be estimated; and association is performed according to a position relationship between the measurement value and an estimation value to determine a one-to-one correlation. At the T2 moment, a distance between targets B and A satisfies the launching condition, and therefore a state estimation value of B at a T3 (a delay duration) moment is predicted according to a state (a position and a velocity, etc.) of B at the moment to obtain (Pb', Ob'), and Pb' is taken as a second state. Based on coordinates Pb' (x, y), by using an inertial measurement unit, a pitch angle is estimated by a Kalman filter, so as to realize control of a position ring and a velocity ring. A single-axis gyroscope module with high stability and high precision is used for a deflection axis to realize the control of the position ring and the velocity ring, and realize follow-up movement of a chassis simultaneously. Finally, the operation of aiming at Pb' (x, y) is completed.

It should be noted that, by taking FIG. 5 as an example, performing association to distinguish the objects based on the estimation value and the actual position mentioned in the above-mentioned method embodiment refers to: at the T1 moment, a state of C, which is (Pc1, Vc1, Oc1); (Pc'), can be obtained after estimation; while in an image at the T2 moment, it is detected that a position, at which there is an object, closest to the distance (Pc') is (Pc2). Therefore, the object at the position (Pc2) at the T2 moment can be determined as C via association. Then, at the T2 moment, a corresponding velocity and movement direction of the state of C can be obtained according to a difference in value between Pa and Pc2 and a difference in value between T2 and T1. The position, velocity and movement direction of the object B at the T2 moment can be obtained in the same way. The determination distinguishing object B and object C and accurate state updates are completed.

The position, velocity, and direction involved in the above-mentioned method embodiment can be a relative variable of the target object with respect to the detection apparatus, and the time interval involved therein can also be a relatively small time interval according to precision requirements.

The embodiments of the present disclosure can relatively accurately identify a target object from an image and perform effective calculation of a movement state and an estimation movement state, and can quickly and accurately complete the tracking and perform state estimation of a target object. This adds new functions and satisfies automation and intelligence requirements of a user for object tracking and movement state estimation.

The detection apparatus and the robot of the embodiments of the present disclosure are described in detail as follows.

Figure 6:
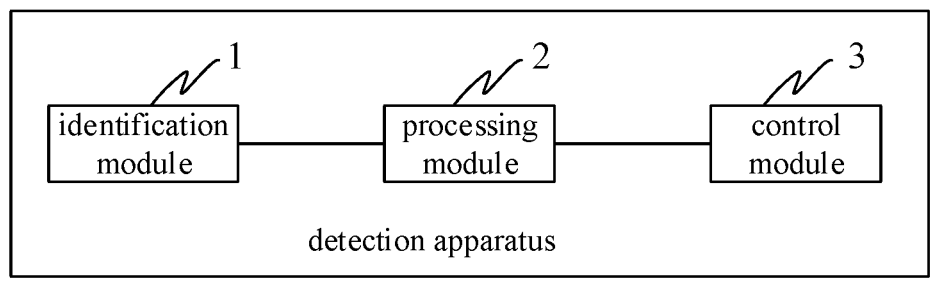
FIG. 6 is a structural schematic diagram of a detection apparatus according to an embodiment of the present disclosure.

With reference to FIG. 6, which is a structural schematic diagram of a detection apparatus according to an embodiment of the present disclosure, the apparatus according to the embodiment of the present disclosure can be arranged on an object, such as a contest robot. Specifically, the apparatus comprises:

an identification module 1, configured to identify a target object in a monitored region, and calculate first state information of the target object with respect to this detection apparatus;

a processing module 2, configured to estimate second state information of the target object after a pre-set delay duration value according to the first state information; and a control module 3, configured to perform a processing operation on the target object according to the estimated second state information.

The identification module 1 can specifically invoke a module, such as a camera, to photograph an image of a monitored region, and identify whether the region comprises a target object at the current moment based on a pre-set color and/or a contour outline and size of the target object. If it does, then first state information is calculated; and if no, then the angle of the camera is changed or the detection apparatus is moved continuously to photograph the image to search for the target object. The camera is a camera after calibration.

After the target object is monitored, the identification module 1 can calculate first state information of the target object with respect to this detection apparatus; and the first state information can specifically comprise: information, such as a position, a movement velocity and a direction of the target object with respect to this detection apparatus. Specifically, the first state information can also be calculated based on the photographed image which comprises the target object.

Specifically, the second state information estimated by the processing module 2 mainly comprises a position and a direction of the target object with respect to this detection apparatus. The pre-set delay duration can be a pre-set time interval, for example, in a robot contest, the pre-set delay duration is comprehensively judged according to an estimation duration in the identification module 1, an adjustment duration of an apparatus, such as a gimbal, for adjusting a direction, and a filling and/or launching duration of a contest cannonball, wherein the estimation duration, adjustment duration, and filling and/or launching duration are duration values that are learned via a large number of actual duration calculation trainings.

After the second state information is obtained, the control module 3 can perform a processing operation on the target object according to practical application requirements. For example, in the contest robot, a directional angle of an apparatus, such as the gimbal, can be adjusted according to relative direction information in the second state information, so as to for the robot to point to and aim at a position in the second state information, and launch a contest cannonball to hit the target object.

Specifically and in some embodiments, the first state information comprises: first position information, velocity information, and movement direction information of the target object with respect to this detection apparatus; and the processing module 2, specifically configured to calculate the displacement of the target object after the pre-set delay duration value according to the velocity information; estimate second position information of the target object after movement according to the first position information, the movement direction information, and the calculated displacement; and determine the second position information as second state information.

Figure 7:
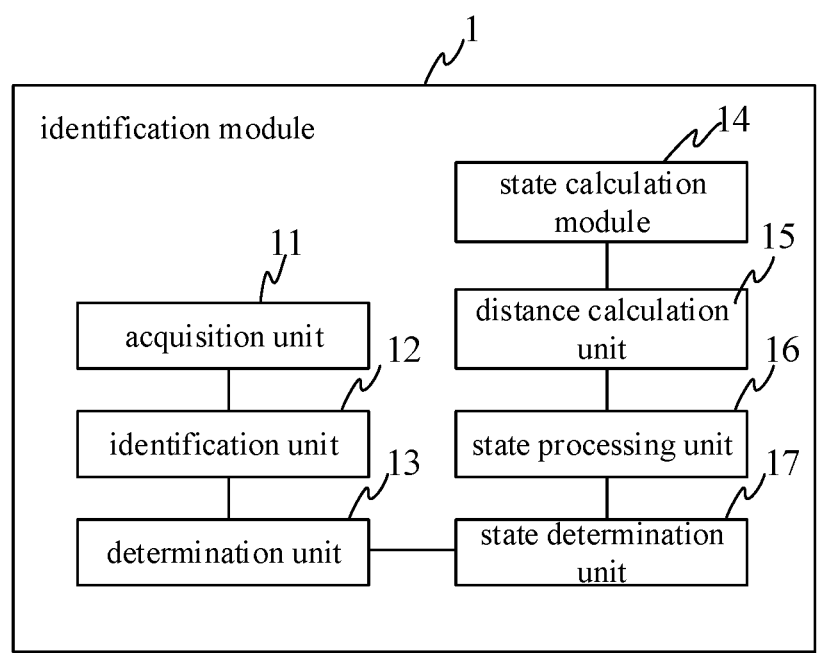
FIG. 7 is a structural schematic diagram of an identification module in FIG. 6.

Specifically and in some embodiments, with reference to FIG. 7, the identification module 1 can comprise:

an acquisition unit 11, configured to acquire an image of the monitored region;

an identification unit 12, configured to analyze and identify whether the image contains a target having a specified color feature; and a determination unit 13, configured to determine the identified target as a target object if an identification result of the identification unit is that the image contains a target having a specified color feature.

Specifically and in some embodiments, the identification unit 12 is specifically configured to perform color detection on the acquired image based on pre-setting a pre-set color interval, so as to determine an initial target region having the specified color feature in the image; quantify the acquired image as a binary image; perform connected component detection on a region corresponding to the initial target region in the binary image, so as to determine a contour outline of the initial target region; perform a merging operation on various determined contour outlines based on a pre-set merging rule; and filter various regions obtained after merging according to pre-set filtering shape or filtering size information and take a filtered region as a target.

Specifically and in some embodiments, the identification unit 12 is specifically configured to filter a noise point in a binary image while being configured to perform connected component detection on a region corresponding to the initial target region in the binary image; and perform connected component detection on a region corresponding to the initial target region in the binary image with the noise point filtered off.

Specifically and in some embodiments, the identification unit 12 is specifically configured to calculate a distance between two adjacent contour outlines according to edge position coordinates of the various determined contour outlines while being configured to perform a merging operation on various determined contour outlines based on the pre-set merging rule; determine a color similarity between the two adjacent contour outlines; and merge two adjacent contour outlines with a distance value and similarity satisfying a pre-set merging distance and similarity requirement.

Specifically and in some embodiments, the identification unit 12 is specifically configured to detect whether a component between two adjacent connected components meets a pre-set sheltering target feature while being configured to perform a merging operation on various determined contour outlines based on the pre-set merging rule. If it does, determining that the two adjacent connected components satisfy the pre-set merging rule, and merging the two adjacent contour outlines.

Specifically and in some embodiments, with reference to FIG. 7, the identification module 1 can further comprise:

a state calculation module 14, configured to calculate movement state information of the target object with respect to this detection apparatus according to a monitored image;

a distance calculation unit 15, configured to calculate a distance value between the target object and this detection apparatus;

a state processing unit 16, configured to calculate the movement state information of the target object with respect to this detection apparatus again according to a monitored new image if the distance value is greater than a pre-set distance threshold value, and judge whether the distance value between the target object and this detection apparatus is less than the pre-set distance threshold value again, repeatedly performing this step until movement state information is determined when the distance value is not greater than the pre-set distance threshold value; and a state determination unit 17, configured to determine the movement state information as the first state information if the distance value is not greater than the pre-set distance threshold value.

Specifically and in some embodiments, the state calculation unit 14 or the state processing unit 16 is specifically configured to determine, while being configured to calculate the movement state information of the target object with respect to this detection apparatus, pixel coordinates of the target object from an image acquired at a current moment, and perform coordinate mapping transformation to obtain initial position information of the target object in a coordinate system centred on the detection apparatus; determine pixel coordinates of the target object from an image acquired at a moment after a pre-set time interval, and perform coordinate mapping transformation to obtain movement position information of the target object in a coordinate system centred on the detection apparatus; determine the movement position information and the pre-set time interval, the velocity information, and the direction information of the target object according to the initial position information; and take the determined velocity information, direction information, and movement position information as the movement state information of the target object.

Specifically and in some embodiments, the detection apparatus can further comprise:

a distinguishing module, configured to perform position estimation on various objects to be monitored based on movement state information of each of the objects, and associate a position estimation value obtained and actual positions of the various objects to be monitored in the image to distinguish each of the objects.

Specifically and in some embodiments, the control module 3 is configured to adjust a rotation parameter of a gimbal according to the second position information in the estimated second state information and a direction with respect to the detection apparatus so that a payload on the gimbal is aimed at the target object.

It should be noted that the specific implementation of various modules and units in the monitoring of the embodiments of the present disclosure can refer to the description of relevant steps in the embodiments corresponding to FIGS. 1 to 5.

The embodiments of the present disclosure can realize identification of a target object and estimation of states such as a movement position, etc., and can quickly and accurately complete the tracking and state estimation of a target object. This adds new functions and satisfies automation and intelligence requirements of a user for object tracking and movement state estimation.

Figure 8:
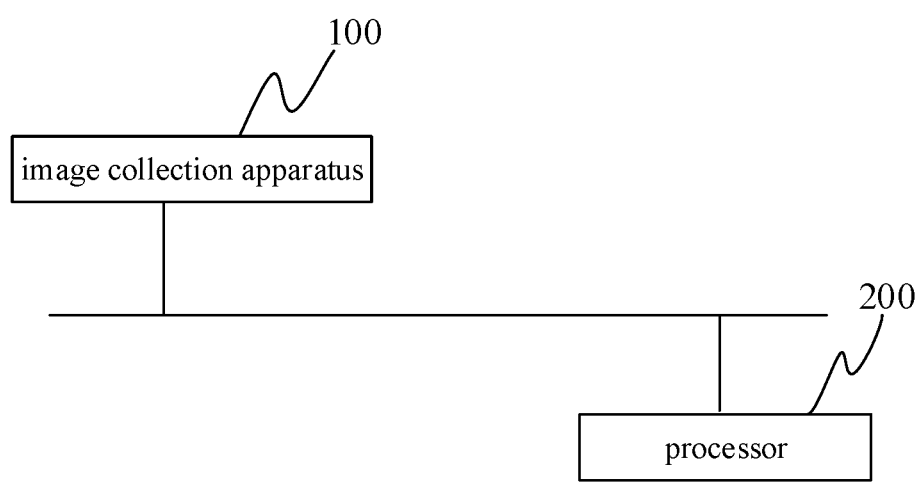
FIG. 8 is a structural schematic diagram of a robot according to an embodiment of the present disclosure.

Furthermore, as shown in FIG. 8, which is a structural schematic diagram of a robot according to an embodiment of the present disclosure, the robot of the embodiment of the present disclosure comprises an existing machine structure, such as a robot shell, a power system, various sensors and controllers. In the embodiment of the present disclosure, the robot further comprises: an image collection apparatus 100 and a processor 200, wherein:

the image collection apparatus 100 is used for photographing an image of a monitored region; and the processor 200 is configured to identify a target object in the monitored region according to the image photographed by the image collection apparatus 100, and calculate first state information of the target object with respect to this detection apparatus; estimate second state information of the target object after a pre-set delay duration value according to the first state information; and perform a processing operation on the target object according to the estimated second state information.

The robot further comprises a gimbal apparatus, the gimbal apparatus can specifically be a dual-axis gimbal or multi-axis gimbal, and is able to realize a processing operation, such as hitting a target in the arena, on the target object by way of adjusting an angle and an orientation.

Furthermore, in one specific implementation, the processor 200 can invoke corresponding application programs to perform the above-mentioned various steps in the embodiments corresponding to FIGS. 1 to 4.

The embodiments of the present disclosure can realize identification of a target object and estimation of states such as a movement position, etc., and can quickly and accurately complete the tracking and state estimation of a target object. This adds new functions and satisfies automation and intelligence requirements of a user for object tracking and movement state estimation.

In the several embodiments provided in the present disclosure, it should be understood that the disclosed relevant apparatus and method may be implemented in other manners. For example, the apparatus embodiments described above are merely illustrative. For example, the division of modules or units is merely a logical function division, and there may be other division methods in actual implementation. For example, a plurality of units or components may be combined or may be integrated into another system, or some features may be omitted or not be executed. In another aspect, the coupling, direct coupling or communicative connection therebetween which is displayed or discussed may be an indirect coupling or communicative connection of interfaces, apparatuses or units, and may be electrical, mechanical or in other forms.

The units described as separate parts may or may not be physically separate, and parts displayed as units may or may not be physical units, that is, may be located in one place, or may also be distributed on multiple network elements. A part or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into a unit. The integrated unit may be implemented in the form of hardware or may be implemented in the form of a software functional unit.

When the integrated unit is implemented in the form of a software functional unit and sold or used as an independent product, the integrated unit may be stored in a computer-readable storage medium. Based on this understanding, the part of the technical solutions of the present disclosure which substantially contributes to the present disclosure over the prior art or all or part of the technical solution may be embodied in the form of a computer software product, and the computer software product is stored in a storage medium, comprising various instructions for causing a computer processor to perform all or some of the steps of the method of individual embodiments of the present disclosure. The above-mentioned storage medium includes: any medium that is capable of storing program codes, such as U-disc, a portable hard disc, a read-only memory (ROM), a random access memory (RAM), a magnetic disc, or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A method for tracking a target object using a detection apparatus comprising:
    calculating movement state information of the target object with respect to the detection apparatus according to one or more monitored images;
    calculating a distance between the target object and the detection apparatus;
    in response to the distance being not greater than a pre-set distance threshold, estimating, based on first state information including the movement state information, second state information of the target object after a pre-set delay duration; and
    performing an operation with respect to the target object according to the estimated second state information.

2. The method of claim 1, further comprising, in response to the distance being greater than the pre-set distance threshold:
    calculating the movement state information of the target object with respect to the detection apparatus again according to a new image;
    judging whether the distance between the target object and the detection apparatus is less than the pre-set distance threshold; and
    repeating the calculating and the judging until the distance is not greater than the pre-set distance threshold value.

3. The method of claim 1, wherein calculating the movement state information of the target object with respect to the detection apparatus includes calculating the movement state information of the target object based on a first image acquired at a current moment and a second image acquired at a moment after a pre-set time interval.

4. The method of claim 3, wherein calculating the movement state information of the target object based on the first image and the second image includes:
    determining initial position information of the target object in a coordinate system centred on the detection apparatus based on the first image;
    determining movement position information of the target object in the coordinate system centred on the detection apparatus based on the second image; and
    determining velocity information and moving direction information of the target object according to the initial position information, the movement position information, and the pre-set time interval, the movement state information of the target object including the velocity information, the direction information, and the movement position information.

5. The method of claim 4, wherein determining the initial position information of the target object in the coordinate system centred on the detection apparatus includes:
    determining pixel coordinates of the target object from the first image; and
    performing a coordinate mapping transformation on the first pixel coordinates to obtain the initial position information of the target object in the coordinate system centred on the detection apparatus.

6. The method of claim 4, wherein determining the movement position information of the target object in the coordinate system centred on the detection apparatus includes:
    determining pixel coordinates of the target object from the second image; and
    performing a coordinate mapping transformation on the pixel coordinates to obtain the movement position information of the target object in the coordinate system centred on the detection apparatus.

7. The method of claim 3, further comprising:
    performing a position estimation on monitored objects based on movement state information of the monitored objects to obtain position estimation values of the monitored objects; and
    determining the monitored objects based on the position estimation values and actual positions of the monitored objects in the second image.

8. The method of claim 1, further comprising:
    generating a control signal according to the movement state information; and
    controlling movement of the detection apparatus according to the control signal.

9. The method of claim 1, wherein:
    the first state information further includes first position information, velocity information, and movement direction information of the target object with respect to the detection apparatus; and estimating the second state information includes:
  calculating, according to the velocity information, a displacement of the target object after the pre-set delay duration; and
  estimating second position information of the target object as the second state information after movement according to the first position information, the movement direction information, and the calculated displacement.

10. The method of claim 1, further comprising:
identifying the target object in a monitored region, including:
  acquiring the one or more monitored images of the monitored region;
  determining whether one of the one or more monitored images contains a target having a specified color feature; and
  if so, determining the identified target as the target object.

11. A movable platform comprising:
a camera configured to capture one or more monitored images of a monitored region; and
a processor configured to:
  calculate movement state information of a target object with respect to the movable platform according to the one or more monitored images;
  calculate a distance between the target object and the movable platform;
  in response to the distance being not greater than a pre-set distance threshold, estimate, based on first state information including the movement state information, second state information of the target object after a pre-set delay duration; and
  perform an operation with respect to the target object according to the estimated second state information.

12. The movable platform of claim 11, wherein the processor is further configured to, in response to the distance being greater than the pre-set distance threshold:
  calculate the movement state information of the target object with respect to the movable platform again according to a new image;
  judge whether the distance between the target object and the movable platform is less than the pre-set distance threshold; and
  repeat the calculating and the judging until the distance is not greater than the pre-set distance threshold value.

13. The movable platform of claim 11, wherein the processor is further configured to calculate the movement state information of the target object based on a first image acquired by the camera at a current moment and a second image acquired by the camera at a moment after a pre-set time interval.

14. The movable platform of claim 13, wherein the processor is further configured to:
  determine initial position information of the target object in a coordinate system centred on the movable platform based on the first image;
  determine movement position information of the target object in the coordinate system centred on the movable platform based on the second image; and
  determine velocity information and moving direction information of the target object according to the initial position information, the movement position information, and the pre-set time interval, the movement state information of the target object including the velocity information, the direction information, and the movement position information.

15. The movable platform of claim 14, wherein the processor is further configured to:
  determine pixel coordinates of the target object from the first image; and
  perform a coordinate mapping transformation on the first pixel coordinates to obtain the initial position information of the target object in the coordinate system centred on the movable platform.

16. The movable platform of claim 14, wherein the processor is further configured to:
  determine pixel coordinates of the target object from the second image; and
  perform a coordinate mapping transformation on the pixel coordinates to obtain the movement position information of the target object in the coordinate system centred on the movable platform.

17. The movable platform of claim 13, wherein the processor is further configured to:
  perform a position estimation on monitored objects based on movement state information of the monitored objects to obtain position estimation values of the monitored objects; and
  determine the monitored objects based on the position estimation values and actual positions of the monitored objects in the second image.

18. The movable platform of claim 11, wherein the processor is further configured to:
  generate a control signal according to the movement state information; and
  control movement of the movable platform according to the control signal.

19. The movable platform of claim 11, wherein:
the first state information further includes first position information, velocity information, and movement direction information of the target object with respect to the movable platform; and
the processor is further configured to:
  calculate, according to the velocity information, a displacement of the target object after the pre-set delay duration; and
  estimate second position information of the target object as the second state information after movement according to the first position information, the movement direction information, and the calculated displacement.

20. The movable platform of claim 11, wherein the processor is further configured to:
  identify the target object in the monitored region, including:
    acquiring the one or more monitored images of the monitored region;
    determining whether one of the one or more monitored images contains a target having a specified color feature; and
    if so, determining the identified target as the target object.

* * * * *